United States Patent
Majewski et al.

(10) Patent No.: US 6,484,396 B1
(45) Date of Patent: Nov. 26, 2002

(54) METHOD FOR MANUFACTURING A CAMSHAFT HAVING ADDED WEAR RESISTANCE OF THE LOBE

(75) Inventors: Thomas Majewski, Groveland, IL (US); Michael J. Pollard, East Peoria, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/896,087

(22) Filed: Jun. 29, 2001

(51) Int. Cl.$^7$ .................................................. B23P 15/00

(52) U.S. Cl. .................... 29/888.1; 29/527.6; 29/527.5; 164/95; 164/96; 164/414

(58) Field of Search ............................. 29/888.1, 527.5, 29/527.6, 530; 74/567; 123/90.6; 164/414–418, 94–96

(56) References Cited

U.S. PATENT DOCUMENTS

| | | | |
|---|---|---|---|
| 4,798,178 A | * | 1/1989 | Greulich et al. ............ 123/90.6 |
| 5,004,370 A | | 4/1991 | Swars |
| 5,245,888 A | * | 9/1993 | Tsuzuki et al. ............ 123/90.17 |
| 6,006,429 A | * | 12/1999 | Hanisch et al. ............ 29/888.1 |
| 6,289,764 B1 | * | 9/2001 | Smith et al. ............... 123/90.6 |

* cited by examiner

*Primary Examiner*—I. Cuda-Rosenbaum
(74) *Attorney, Agent, or Firm*—Andrew M Calderon

(57) ABSTRACT

A method of manufacturing a camshaft used in an internal combustion engine. The method of manufacturing the camshaft produces a camshaft which has reduced weight and added wear resistance at a lobe of the camshaft. The camshaft is manufactured to provide increased efficiency of the internal combustion engine. The method of making the camshaft includes mixing wear resistant material with a base material and metering the mixture into a rotating die. The rotating die rotates at a predetermined speed and forces the wear resistant material to the outer surface of the lobes.

20 Claims, 3 Drawing Sheets

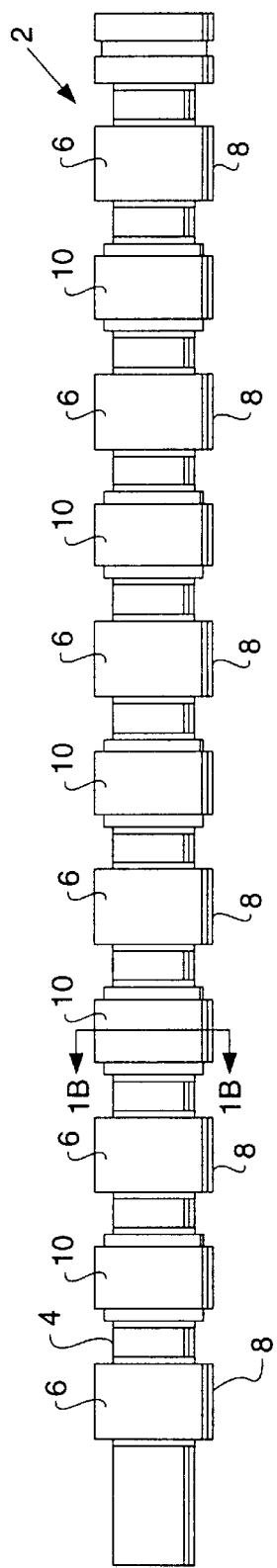
Fig - 1a
Fig - 1b
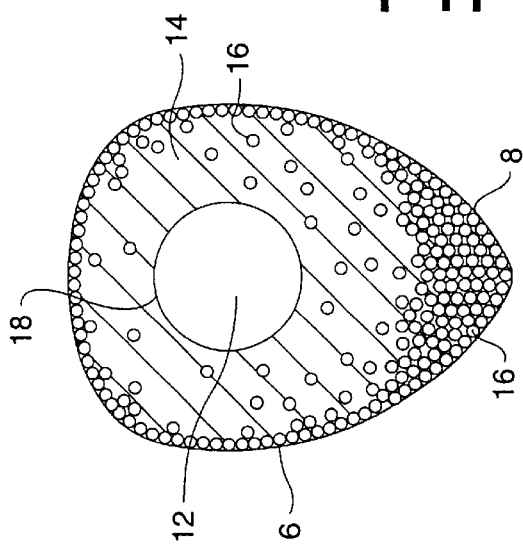

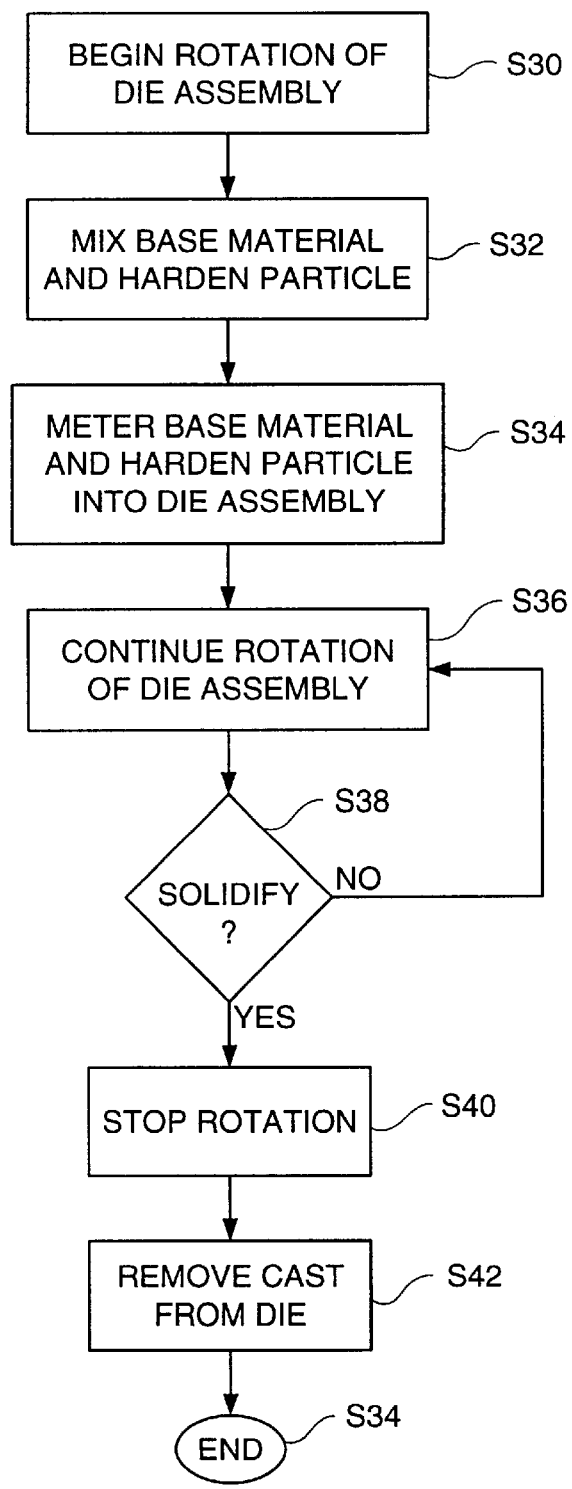

_US 6,484,396 B1_

METHOD FOR MANUFACTURING A CAMSHAFT HAVING ADDED WEAR RESISTANCE OF THE LOBE

TECHNICAL FIELD

This invention relates generally to a method for manufacturing a camshaft and more particularly to a method for manufacturing a camshaft having added wear resistance at a lobe area of the camshaft.

BACKGROUND ART

Manufacturing processes for components of an internal combustion engine have evolved through the years so that such engine components can meet ever increasing performance requirements, e.g., increased stress tolerances and the like. These manufacturing processes have made the internal combustion engine more reliable and efficient; however, current manufacturing processes require additional steps or processes to add wear resistance properties to specific components of the internal combustion engine such as, for example, the camshaft of the internal combustion engine and more specifically the lobe regions of the camshaft. By providing added wear resistant properties to the camshaft, the internal combustion engine would be even more efficient than which is currently possible.

Being more specific, the lobe regions of the camshaft are subject to metal fatigue due to extensive contact between the lobes of the camshaft and respective rocker arms of the intake and exhaust valves. This contact wears down the lobe regions of the camshaft thus resulting in poor engine performance. However, current manufacturing processes do not address these problems and, in particular, do not provide a means for providing wear resistance properties at a particular region, e.g., lobes, of the camshaft.

By way of example, current casting processes do not provide adequate wear resistance properties at the lobe region of the camshaft. For example, in green sand casting processes a pattern which conforms to the external shape of the camshaft is formed. The pattern is then used to form a green sand mold which is made in an open frame or flask such that both the flask and the pattern are capable of being parted to facilitate removal of the pattern from the sand. A molten metal such as iron is then poured into the formed sand mold and, after solidifing, the cast iron is removed from the mold. Depending on the particular application of the camshaft, hardening materials may be added to the iron. The hardening materials, however, migrate to the bottom of the mold resulting in an uneven distribution of the hardening materials within the iron. By adding the hardening material, the integrity of the camshaft may be negatively impacted due to the uneven distribution of materials within the camshaft.

In another method of manufacturing camshafts, a camshaft is forged using known forging techniques. In particular, in known forging techniques a die is first formed, and a forging material such as alloys, aluminum or steel is heated to a desired temperature. The heated material is placed under pressure within the die until the forging material conforms to the shape of the die. The forging process is unable to provide added wear resistance properties to specific regions of the forged component such as the lobe regions of the camshaft. This is mainly due to the fact that the forging process cannot precisely place wear resistant material in specific locations which would correspond to the lobes of the camshaft.

U.S. Pat. No. 5,004,370 to Swars issued on Apr. 2, 1991 discloses a hollow shaft having drive elements (e.g., cams) with axially varied properties. The drive elements are secured on the hollow shaft by expansion of the hollow shaft, and includes a separate outside layer produced by an induction-hardened process. This outside layer, however, is not distributed throughout the drive elements, nor is it distributed within the hollow shaft. Accordingly, the apparatus of Swars has a tendency to wear during the use of the internal combustion engine, and does not appear to adequately withstand high torsional stresses.

The present invention is directed to overcoming one or more of the problems as set forth above.

DISCLOSURE OF THE INVENTION

In one aspect of the present invention a method for manufacturing a camshaft is provided. The method includes forming an integrated mixture of a base material having a first density and a wear resistant material having a second density. The method has the steps of metering the integrated mixture into a die having an interior shape corresponding to a shape of the camshaft, and rotating the die. The rotation of the die forces the wear resistant material to migrate toward the outside of the lobe. After the rotating step, the camshaft is removed from the rotating die when the integrated mixture is solidified.

In another aspect of the present invention, the method of manufacturing a camshaft having a wear resistant lobe uses a rotating assembly having a rotating die. The rotating die has an interior shape corresponding to the camshaft. The method of making the crankshaft mixes a base material and a wear resistant material to form an integrated mixture. The wear resistant material is harder than the base material. The integrated mixture is metered into the rotating die, and the rotating die is then rotated so that the wear resistant material is forced toward an outer surface of the lobe. After the integrated mixture is solidified, the camshaft is removed from the rotating die.

BRIEF DESCRIPTION OF THE DRAWINGS

FIG. 1a shows a diagrammatic view of a camshaft manufactured in accordance with the method of the present invention;

FIG. 1b shows a cut-away view along line 1b—1b of the camshaft of FIG. 1a;

FIG. 3 shows a flow diagram depicting the manufacturing steps for manufacturing the camshaft in accordance with the present invention.

BEST MODE FOR CARRYING OUT THE INVENTION

Figure 2:
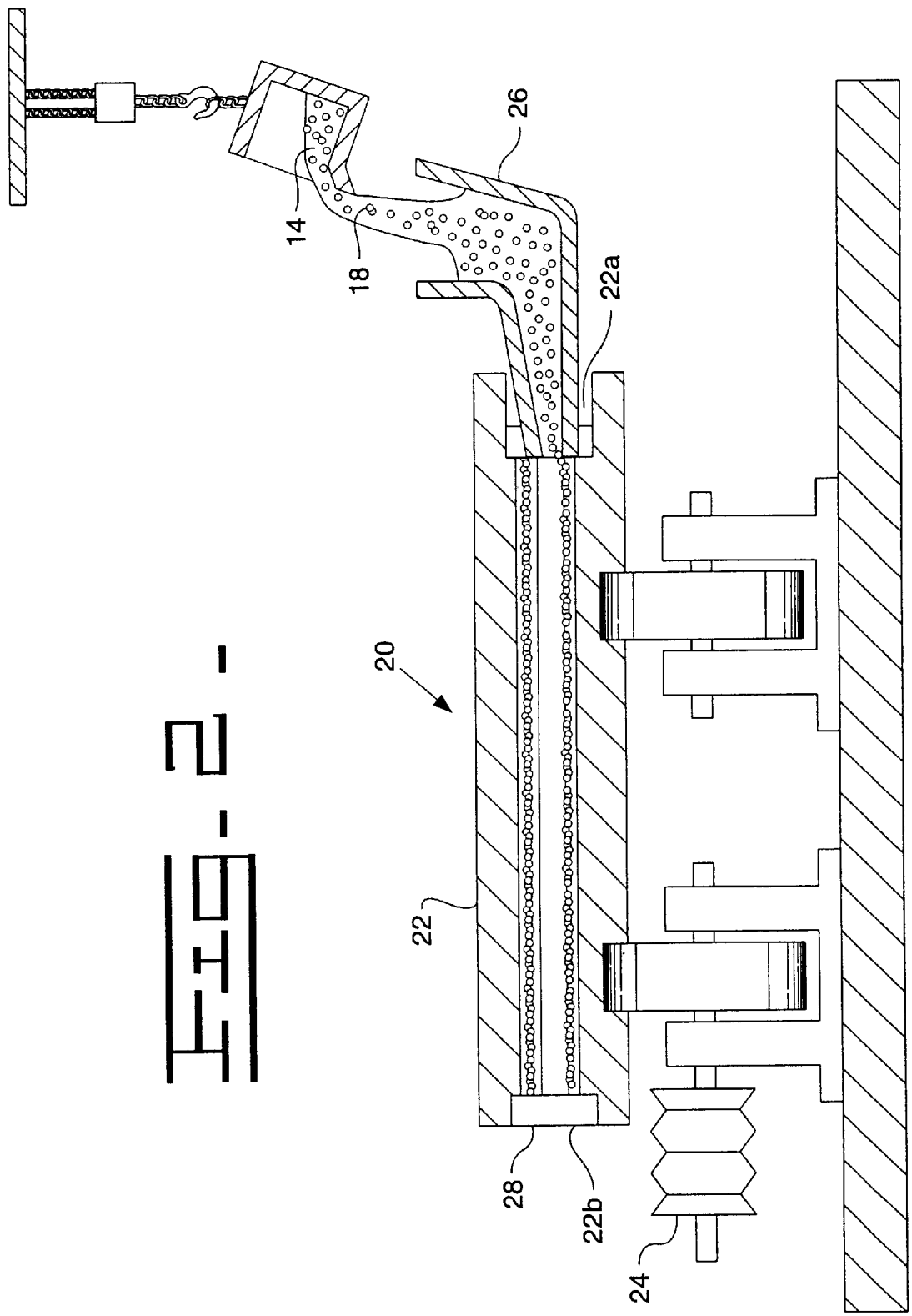
FIG. 2 shows a diagrammatic view of an apparatus used to manufacture the camshaft in accordance with the present invention.

Referring to FIG. 1a, a diagrammatic view of a camshaft 2 manufactured in accordance with the method of the present invention is shown. The camshaft 2 includes a camshaft body or shaft 4 and a plurality of cams 6 extending along the length of the shaft 4. A lobe 8 extends from each cam 6. The camshaft 2 may also include other features such as camshaft journal bearings 10 spaced apart in an alternating pattern with the cams 6. The specific dimensions of these features are not discussed herein and are not critical to the understanding of the present invention.

FIG. 1b shows a cut-away view along line 1b—1b of the camshaft 2 of FIG. 1a. As seen in FIG. 1b, the camshaft 2 includes an axially oriented hollow interior portion 12. The components of the camshaft 2 are composed of a base material 14 such as steel or cast iron in combination with wear resistant material 16. The wear resistant material 16 is distributed throughout the camshaft 2, and more preferably within and on an outer surface of each lobe 8. The wear resistant material 16 may also be distributed in the journal bearings 10 and, to an extent, throughout the shaft 4.

Referring still to FIG. 1b, the wear resistant material 16 is incorporated into the base material 14 and is approximately 20% to 40% of volume in relation to the base material 14 on the surface of the lobe 8. The percentage volume of the wear resistant material 16 gradually decreases to zero on the inside of shaft 4; that is, a surface 18 of the hollow interior portion 12 is preferably devoid of the wear resistant material 16.

FIG. 2 shows an apparatus used to manufacture the camshaft 2 in accordance with the present invention. In particular, FIG. 2 shows a horizontal centrifugal casting apparatus 20 having a rotating die 22 positioned on a drive arrangement 24 which rotates the rotating die 22. The rotating die 22 has an interior shape corresponding to the features of the camshaft 2 including the cams 6 and the lobes 8. The interior shape of the rotating die 22 may also correspond with other camshaft 2 features such as the journal bearings 10 and the like. A funnel 26 is positioned at a first end 22a of the rotating die 22 and an end cap 28 is positioned at a second end 22b of the rotating die 22. The base material 14 and the wear resistant material 16 are poured into the funnel 26 of the rotating die 22, and are further retained within the rotating die 22 via the end cap 28. The base material 14 may be steel or iron or other similar material. The wear resistant material 16 may be a carbide material such as tungsten carbide having particles approximately 50 microns in size. The wear resistant material 15 may also be ferro-tungsten/titanium carbide approximately 5 microns in size. When using the carbide based materials, it is preferable to use iron for the base material 14 of the camshaft due to the high content of carbon within the iron. (The carbons within the carbide material are not sacrificed due to the high content of carbon in the cast iron thus allowing the carbide wear resistant material to retain its integrity during the casting process.)

It should be recognized by those of skill in the art that other base materials 14 and wear resistant materials 16 (including other particle sizes) may also be used with the present invention, depending on the particular application of the camshaft 2. These other wear resistant materials 16 may be ceramic or diamond material or any material that has a higher density (or harder) than that of the base material 14. The wear resistant material 16 should also have a higher melting point than the base material 14.

FIG. 3 shows a flow diagram depicting the manufacturing steps in accordance with the present invention. In step S30, the rotating die 22 is rotated via the use of the drive assembly 24. The specific rotation speed of the rotating die 22 depends on many variables, some of which are the specific materials and proportions of materials used to form the camshaft 10 as well as the dimensions of the camshaft 10 being manufactured in accordance with the method of the present invention. However and by way of example, the rotating die 22 may be rotated at a predetermined speed, preferably about 60 G or about 1200 revolutions per minute (RPM), but may also be in the range of 40–100 G or between about 1000–1600 RPM.

In step S32, the base material 14 and the wear resistant material 16 are mixed together to form an integrated mixture. The ratio of the wear resistant material 16 to the base material 14 may vary depending on which base material 14 and wear resistant material 16 is used to form the camshaft 2. By way of example, the wear resistant material 16 should be in a ratio with the base material 14 such that the wear resistant material 16 is approximately 20% to 40% of volume in relation to the base material 14 on the surface of the lobe 8.

In step S34, the mixture of the base material 14 and the wear resistant material 16 is metered into the rotating die 22. The volume of the integrated mixture of the base material 14 and the wear resistant material 16 should be less than the volume of the rotating die 22.

In step S36, the rotating die 22 continues to rotate at a predetermined speed. The rotation of the rotating die 22 creates centrifugal forces within the rotating die 22 which, in combination with the reduced volume of the integrated mixture, creates the axially oriented hollow interior portion 12 of the camshaft 2.

In step S38, a determination is made as to whether the integrated mixture of the base material 14 and the wear resistant material 16 has solidified. The solidification rate will depend on many variables such as, for example, the specific materials used to form the camshaft 2 as well as the initial temperature of the materials, etc. If the integrated mixture is not solidified, steps S36 and S38 are repeated. Once the mixture of the base material 14 and the wear resistant material 16 is solidified, the rotating die 22 is stopped in step S40. In step S42, the solidified camshaft 2 is then removed from the rotating die 22 and the hollow interior portion 12 of the camshaft 2 is machined. In step S44, the process ends.

Furthermore from FIGS. 2 and 3, several stages of the manufacturing process of the camshaft using the method of the present invention can be projected. For example, the rotating die 22 rotating in a clockwise direction. During the rotation, the impurities 14a remain near the hollow interior portion 12. The wear resistant material 15 is forced outwards towards the walls of the rotating die 18 (e.g., towards the lobes 8 of the camshaft 2). The concentration of the impurities 14a in the hollow interior portion 18 after the integrated mixture of the base material 14 and the wear resistant material 16 have solidified in step S38 of FIG. 3. Also, the concentration of the wear resistant material 16 collects at the walls of the rotating die 22. And, the impurities 14a can be removed from the hollow interior portion 12 after the machining step of S42 of FIG. 3.

Industrial Applicability

The present invention is directed to a method of manufacturing the camshaft 2 having added wear resistance at the lobe 8. During the method of making the camshaft 2, the rotation of the rotating die 22 creates centrifugal forces within the rotating die 22 which, in combination with the reduced volume of the integrated mixture, creates the axially oriented hollow interior portion 12 of the camshaft 2. The hollow interior portion 12 is preferably devoid of the wear resistant material 16 so that the impurities 14a may be machined from the surface of the hollow interior portion 12 without damaging the tooling used for the machining process. The hollow interior portion 12 also reduces the weight of the camshaft 2 which increases the efficiency of the internal combustion engine.

During the rotation process, the denser wear resistant material 16 migrates to the lobe 8. The wear resistant material 15 within the lobe 8 ensures that the lobe 8, in particular, does not wear due to metal fatigue from extensive contact.

It is noted that the higher density of the wear resistant material 16 allows the wear resistant material 16 to migrate to the outer surface of the lobe 8 during the rotation process. Also, the wear resistant material 16 should also have a higher melting point than the base material 14 to ensure the integrity of the wear resistant material 16 during the manufacturing process of the camshaft 2.

Other aspects, objects and advantages of this invention can be obtained from a study of the drawings, the disclosure and the appended claims.

What is claimed is:

1. A method for manufacturing a camshaft, comprising the steps of:
    forming an integrated mixture of a base material having a first density and a wear resistant material having a second density, the second density being more dense than the first density;
    metering the integrated mixture into a die, the die having an interior shape corresponding to a shape of the camshaft including a cam and a lobe extending from the cam;
    rotating the die at a predetermined speed, the predetermined speed forcing the wear resistant material to migrate toward the outside of the lobe; and
    removing a formed camshaft from the rotating die when the integrated mixture is solidified.

2. The method of claim 1, wherein the rotating step forces approximately 20% to 40% of volume of the wear resistant material in relation to the base material to a surface of the lobe.

3. The method of claim 2, wherein:
    the interior shape of the die includes a shaft and the cam extends from the shaft; and
    the percentage volume of the wear resistant material decreases to zero in the shaft during the rotating step.

4. The method of claim 3, wherein the rotating step forms a hollow interior portion in the shaft of the camshaft.

5. The method of claim 4, wherein impurities of the integrated mixture. remain near the hollow interior portion of the shaft during the rotating step.

6. The method of claim 5, including machining the impurities from the hollow interior portion.

7. The method of claim 1, including:
    determining whether the integrated mixture is solidified prior to the removing step; and
    continuing the rotation of the die at the predetermined speed when it is determined in the determining step that the integrated mixture is not solidified.

8. The method of claim 1, wherein:
    the wear resistant material includes a carbide based material; and
    the base material includes steel or iron.

9. The method of claim 8, wherein the carbide material is one of tungsten carbide and ferro-tungsten/titanium carbide.

10. The method of claim 1, wherein the wear resistant material has a higher melting point temperature than the base material.

11. The method of claim 1, wherein the wear resistant material is one of ceramic and diamond material.

12. The method of claim 1, wherein the metering step includes metering a volume of the integrated mixture into the die which is less than a volume of the die.

13. A method of manufacturing a camshaft having a wear resistant lobe, the method using a rotating assembly having a rotating die having an interior shape corresponding to the camshaft, the method comprising the steps of:
    mixing a base material and a wear resistant material to form an integrated mixture, the wear resistant material being harder than the base material;
    metering the integrated mixture into the rotating die;
    rotating the rotating die at a predetermined speed, the predetermined speed forces the wear resistant material toward an outer surface of the lobe; and
    removing a formed camshaft from the rotating die when the integrated mixture is solidified.

14. The method of claim 13, wherein the rotating step forces approximately 20% to 40% of volume of the wear resistant material in relation to the base material to a surface of the lobe of the camshaft.

15. The method of claim 14, wherein the percentage volume of the wear resistant material decreases to zero in an inner portion of the camshaft during the rotating step.

16. The method of claim 13, wherein the rotating step forms a hollow interior portion in the camshaft and impurities of the integrated mixture remain near the hollow interior portion during the rotating step.

17. The method of claim 16, including machining the impurities from the hollow interior portion.

18. The method of claim 13, including:
    determining whether the integrated mixture is solidified prior to the removing step; and
    continuing the rotation of the rotating die at the predetermined speed when it is determined in the determining step that the integrated mixture is not solidified.

19. The method of claim 13, wherein the wear resistant material has a first density and the base material has a second density, the first density being more dense than the second density such that the rotating step forces the wear resistant material having the first density toward the lobe.

20. The method of claim 19, wherein the wear resistant material has a higher melting point temperature than the base material.

* * * * *